United States Patent
Manikfan et al.

(10) Patent No.: US 10,216,669 B2
(45) Date of Patent: Feb. 26, 2019

(54) BUS BRIDGE FOR TRANSLATING REQUESTS BETWEEN A MODULE BUS AND AN AXI BUS

(71) Applicant: Honeywell International Inc., Morris Plains, NJ (US)

(72) Inventors: Sameer D. Manikfan, Andhra Pradesh (IN); David Lyle Kirk, Phoenix, AZ (US); Jay W. Gustin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 262 days.

(21) Appl. No.: 15/051,239

(22) Filed: Feb. 23, 2016

(65) Prior Publication Data
US 2017/0242813 A1    Aug. 24, 2017

(51) Int. Cl.
*G06F 13/364*    (2006.01)
*G06F 13/16*    (2006.01)
*G06F 13/42*    (2006.01)

(52) U.S. Cl.
CPC ........ *G06F 13/364* (2013.01); *G06F 13/1673* (2013.01); *G06F 13/4282* (2013.01)

(58) Field of Classification Search
CPC .................................................. G06F 13/4004
See application file for complete search history.

(56) References Cited

U.S. PATENT DOCUMENTS

| 5,590,292 A * | 12/1996 | Wooten ............... G06F 13/4022 370/419 |
| 6,272,584 B1 * | 8/2001 | Stancil .................. G06F 13/362 710/10 |
| 8,949,500 B2 | 2/2015 | Byrne et al. |
| 2007/0067549 A1 * | 3/2007 | Gehman ............. G06F 13/4031 710/315 |
| 2007/0101032 A1 | 5/2007 | Nara |
| 2011/0055439 A1 | 3/2011 | Chen et al. |
| 2012/0005391 A1 | 1/2012 | Byrne et al. |
| 2013/0166801 A1 | 6/2013 | Chun et al. |
| 2014/0297906 A1 * | 10/2014 | Kojima ............... G06F 13/4004 710/52 |
| 2015/0121121 A1 * | 4/2015 | Cebulla ............... G06F 11/2033 714/3 |

FOREIGN PATENT DOCUMENTS

WO    2013044270 A2    3/2013

\* cited by examiner

*Primary Examiner* — Farley Abad

(57) ABSTRACT

A method for bus bridging includes providing a bus interface device that is coupled between at least one module bus and at least one advanced extensible interface (AXI) bus for translating bus requests between the module bus and the AXI bus. The bus interface device includes logic. The logic is configured to receive a read/write (R/W) request that is one of a module bus protocol R/W request and an AXI bus protocol R/W request and to buffer the R/W request to provide a buffered R/W request. The logic translates the buffered R/W request to a first AXI protocol conforming request if the buffered R/W request is the module bus protocol R/W request and translates the buffered R/W request to a first module bus protocol conforming request if the buffered R/W request is the AXI bus protocol R/W request. The translated requests are transmitted to their respective bus.

20 Claims, 7 Drawing Sheets

BUS BRIDGE FOR TRANSLATING REQUESTS BETWEEN A MODULE BUS AND AN AXI BUS

FIELD

Disclosed embodiments relate to inter-circuit communication between a microprocessor and a circuit used in industrial communications, and more specifically relate to a bus bridge for translating read/write requests between a module bus and an advanced extensible interface (AXI) bus.

BACKGROUND

Industrial facilities use communication networks to transmit and receive information and data. The industrial facilities can include various industries and applications such as process or industrial manufacturing, building automation, substation automation, and automatic meter reading. The communication networks can use a variety of computers, servers and other devices that communicate with each other.

The industrial facilities can have legacy communication devices that over time require updating and replacement. Unfortunately, after a number of years, manufacturers can discontinue the manufacture of devices that support a specific communication protocol. One such legacy system that is facing obsolesce are local control network (LCN) chassis based systems that support the module bus communication protocol. Newer devices that support modern communication protocols such as the advanced extensible interface bus are incapable of communicating with systems that utilize the module bus.

SUMMARY

This summary is provided to introduce a brief selection of disclosed concepts in a simplified form that are further described below in the Detailed Description including the drawings provided. This Summary is not intended to limit the claimed subject matter's scope.

Disclosed embodiments comprise a method for bus bridging. The method includes providing a bus interface device communicatively coupled between at least one module bus and at least one advanced extensible interface (AXI) bus for translating bus requests between the module bus and the AXI bus. The bus interface device includes logic such as a gate array or programmable logic (hereafter called either logic or programmable logic). The logic is configured to receive a read/write (R/W) request that is one of a module bus protocol (module bus protocol R/W request) and an AXI bus protocol (AXI bus protocol R/W request), and to buffer the R/W request to provide a buffered R/W request. The logic translates the buffered R/W request to a first AXI protocol conforming request if the buffered R/W request is the module bus protocol R/W request and translates the buffered R/W request to a first module bus protocol conforming request if the buffered R/W request is the AXI bus protocol R/W request. The first AXI protocol conforming request is transmitted to the AXI bus or the first module bus protocol conforming request is transmitted to the module bus.

Another disclosed embodiment comprises a bus interface device. The bus interface device includes a processor and logic such as a gate array or programmable logic in communication with the processor. The bus interface device is communicatively coupled between at least one module bus and at least one advanced extensible interface (AXI) bus for translating bus requests between the module bus and the AXI bus. The logic is configured to receive a read/write (R/W) request that is one of a module bus protocol (module bus protocol R/W request) and an AXI bus protocol (AXI bus protocol R/W request) and to buffer the R/W request to provide a buffered R/W request. The logic translates the buffered R/W request to a first AXI protocol conforming request if the buffered R/W request is the module bus protocol R/W request and translates the buffered R/W request to a first module bus protocol conforming request if the buffered R/W request is the AXI bus protocol R/W request. The first AXI protocol conforming request is transmitted the AXI bus or the first module bus protocol conforming request is transmitted to the module bus.

DETAILED DESCRIPTION

Figure 1:
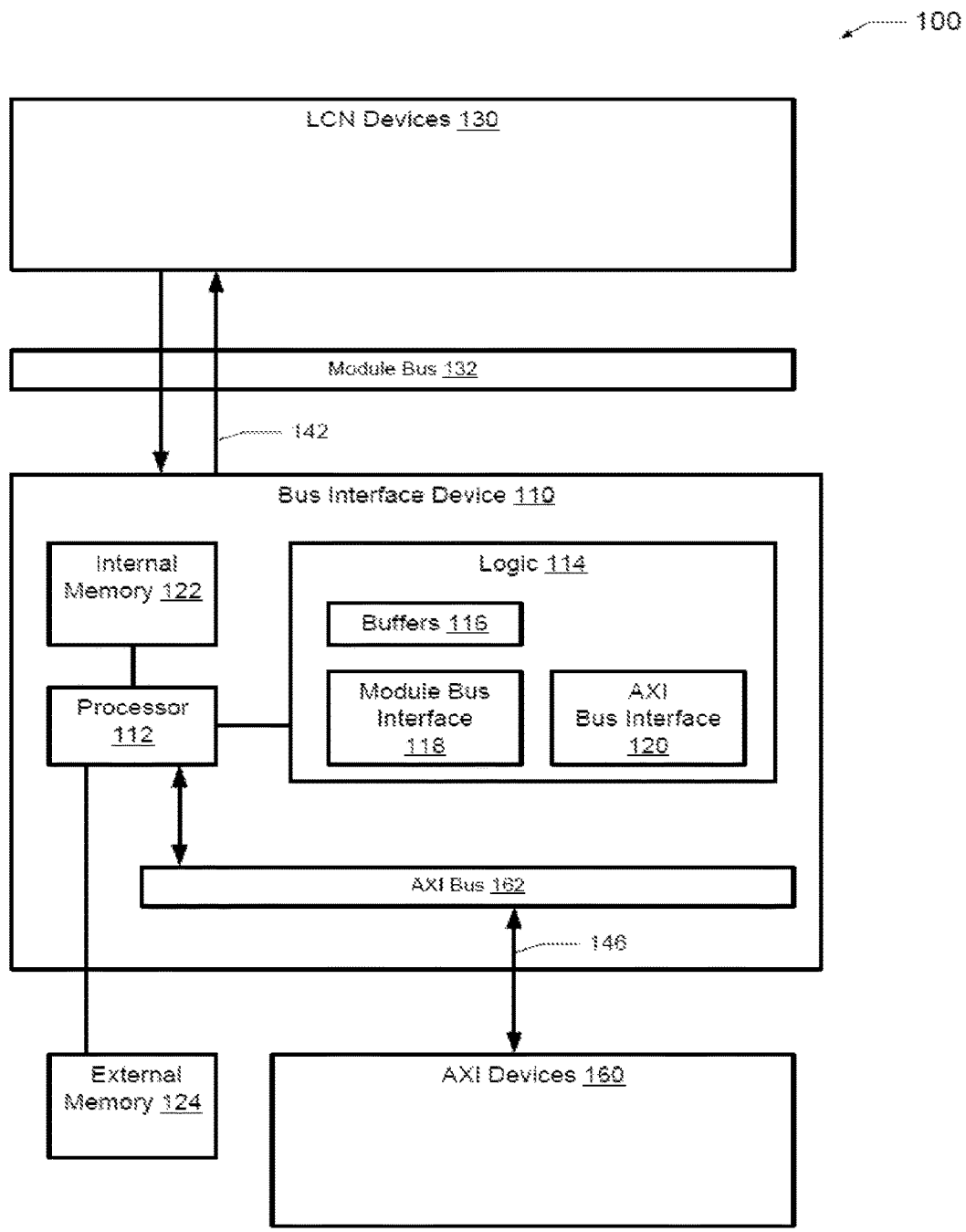
FIG. 1 is a block diagram of an example bus bridge interface device for translating read/write requests between a module bus and an AXI bus, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 illustrates a block diagram of an example system 100 for translating read/write requests between a module bus and an advanced extensible interface bus. As shown in FIG. 1, system 100 comprises a bus interface device 110 that is in communication with one or more local control network (LCN) devices 130 via module bus 132. Module bus 132 can include uni-directional data, address lines and control lines 142. Bus interface device 110 is further in communication with one or more AXI devices 160 via AXI bus 162. Module bus 132 can include data bi-directional data, address and control lines 146.

Bus interface device 110 includes a processor 112 (e.g., digital signal processor (DSP), microprocessor or microcontroller unit (MCU)) that is coupled to an associated internal memory 122 and to external memory 124. Processor 112 is also coupled to logic 114 which facilitates the translation of read/write requests between module bus 132 and AXI bus 162. In one embodiment, logic 114 is an application specific integrated circuit (ASIC). In another embodiment, the logic 114 is a gate array such as a field programmable gate array (FPGA). Logic 114 can perform any one or more of the operations, applications, methods or methodologies described herein. Logic 114 performs the translation of read/write requests between module bus 132 and AXI bus 162 because a human cannot monitor and translate read/write requests continuously on the order of nano-seconds as this is obviously too fast for a person to do.

In one embodiment, processor 122 configures logic 114 during system power on during normal operation (except in Joint Test Action Group (JTAG) mode which is used for test and debug). Processor 112 can include an AXI bus interface which connects to the AXI Interconnect. Bus interface device 110 is between the AXI Interconnect and Module Bus interface 118, implemented in the programmable logic 114. After system power on, processor 112 configures programmable logic 114 with the AXI bus interface device logic, the module bus interface logic and Local Control Network Interface (LCNI). After the programmable logic 114 is configured, the processor 112 communicates with a Local Control Network Interface (LCNI) via bus interface device 110 and the module bus interface 118.

Logic 114 is shown including one or more buffers 116 for the temporary storage of received read/write requests. Logic 114 further includes a module bus interface 118 and an AXI bus interface 120. The logic 114 is hardware programmable via the use of state machines to translate read/write requests between module bus 132 and AXI bus 162. Module bus interface 118 contains electronic circuits that perform the translation of received AXI bus protocol read/write requests to module bus protocol requests. AXI bus interface 120 contains electronic circuits that perform the translation of received module bus protocol read/write requests to AXI bus protocol requests.

In one particular embodiment, bus interface device 110 can be a Zynq 7000 All Programmable silicon on chip (SoC) device that is commercially available from Xilinx Corporation of San Jose, Calif. The Zynq 7000 device integrates the software programmability of an ARM based processor (i.e. processor 112) with the hardware custom programmability of a field programmable gate array FPGA (i.e. logic 114).

This disclosure bridges a legacy processor bus (Module Bus 132) to an AXI bus 162 of processor 112. The time to process read and write AXI bus requests is of the order of 100 ns using a 40 MHz clock. A read/write start to response takes 4 clock cycles. Due to this speed it would not be possible for a human to process read and write paths concurrently as required in an AXI bus protocol.

Figure 2:
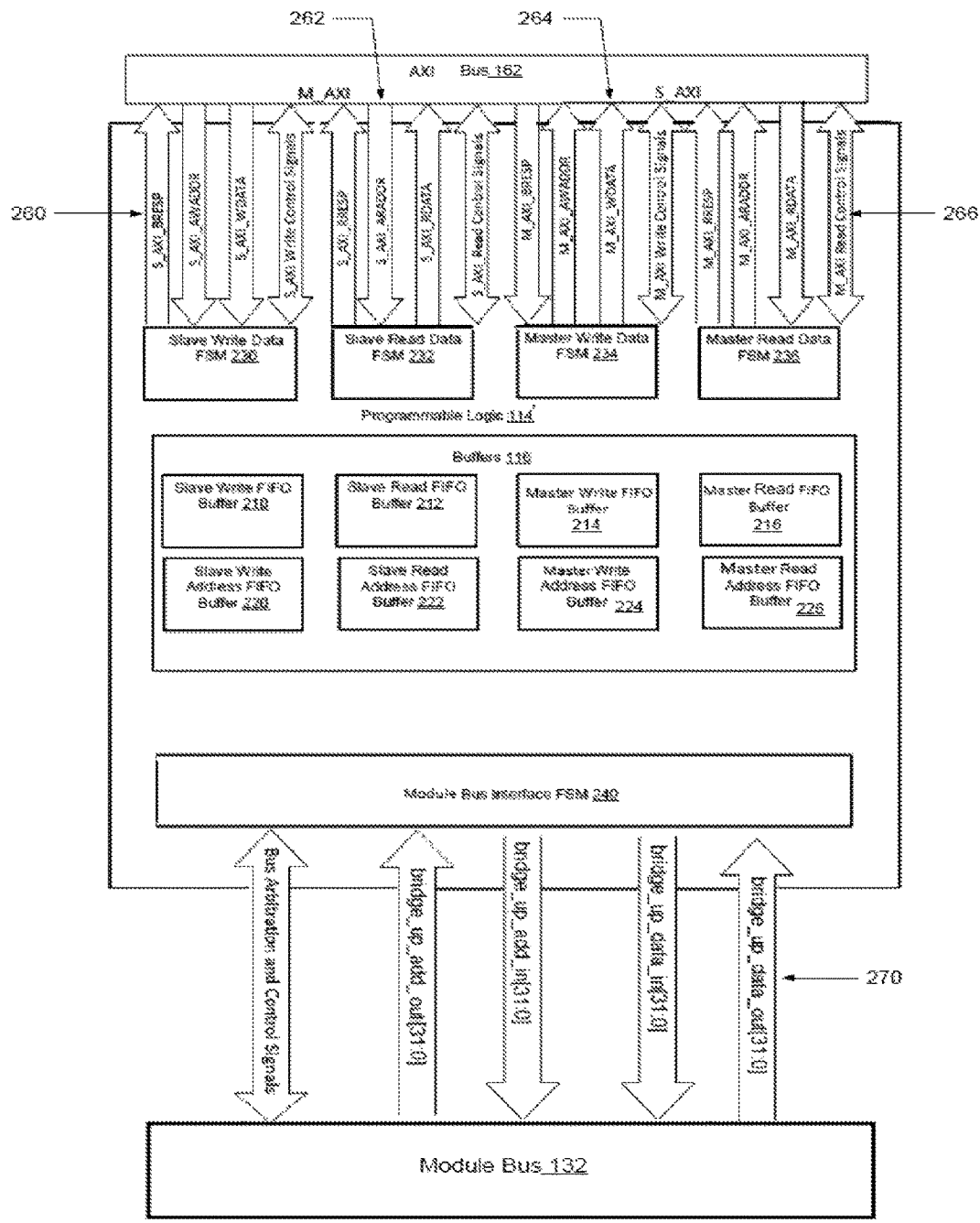
FIG. 2 is a block diagram of an example programmable logic of the bus bridge interface device, according to an example embodiment.

FIG. 2 illustrates further details of logic 114 embodied as programmable logic shown as 114' that can cause bus interface device 110 to perform any one or more of the methods, processes, operations, applications, or methodologies described herein. The Programmable logic 114' includes several buffers 116. Buffers 116 comprise a slave write first in first out (FIFO) buffer 210, a slave read FIFO buffer 212, a master write FIFO buffer 214, a master read FIFO buffer 216, a slave write address FIFO buffer 220, a slave read address FIFO buffer 222, a master write address FIFO buffer 224 and a master read address FIFO buffer 226. Each of buffers 216-224 can temporarily store received read and/or write requests that require translation to a different bus protocol.

Programmable logic 114' further includes several finite state machines (FSM). The FSMs are implemented as sequential logic circuits within programmable logic 114'. The FSMs can be in one of a finite number of states. The FSMs are in only one state at a time which is called the current state. The state can change from one state to another when initiated by a triggering event or condition which is called a transition. A particular FSM is defined by a list of its states, and the triggering condition for each transition. The FSMs include a slave write data FSM 230, a slave read data FSM 232, a master write FSM 234, a master read FSM 236 and a module bus interface FSM 240.

In one embodiment, slave write data FSM 230 is connected to AXI bus 162 via slave write data, address and control lines 260 including a S_AXI_BRESP line, a S_AXI_AWADDR line, a S_AXI_WDATA line and S_AXI write control signal lines. Slave read data FSM 232 is connected to AXI bus 162 via slave write data, address and control lines 262 including a S_AXI_RRESP line, a S_AXI_ARADDR line, a S_AXI_RDATA line and S_AXI read control signal lines.

Master write data FSM 234 is connected to AXI bus 162 via master write data, address and control lines 264 including a M_AXI_BRESP line, a M_AXI_AWADDR line, a M_AXI_WDATA line and M_AXI write control signal lines. Master read data FSM 236 is connected to AXI bus 162 via master write data, address and control lines 266 including a M_AXI_RRESP line, a M_AXI_ARADDR line, a M_AXI_RDATA line and M_AXI read control signal lines.

Module bus interface FSM 240 is connected to module bus 132 via data, address and control lines 270 including a bridge_up_data_out line, a bridge_up_data_in line, a bridge_up_add_in line, a bridge_up_addr_out line and module bus arbitration and control signal lines.

In one embodiment, buffers 210-226 receive and temporally store (buffer) incoming R/W requests. FSMs 230-236 translates buffered R/W request to AXI protocol conforming requests if the buffered R/W requests are module bus protocol R/W requests. FSM 240 translates buffered R/W requests to module bus protocol conforming requests if the buffered R/W requests are AXI bus protocol R/W requests.

Figure 3A:
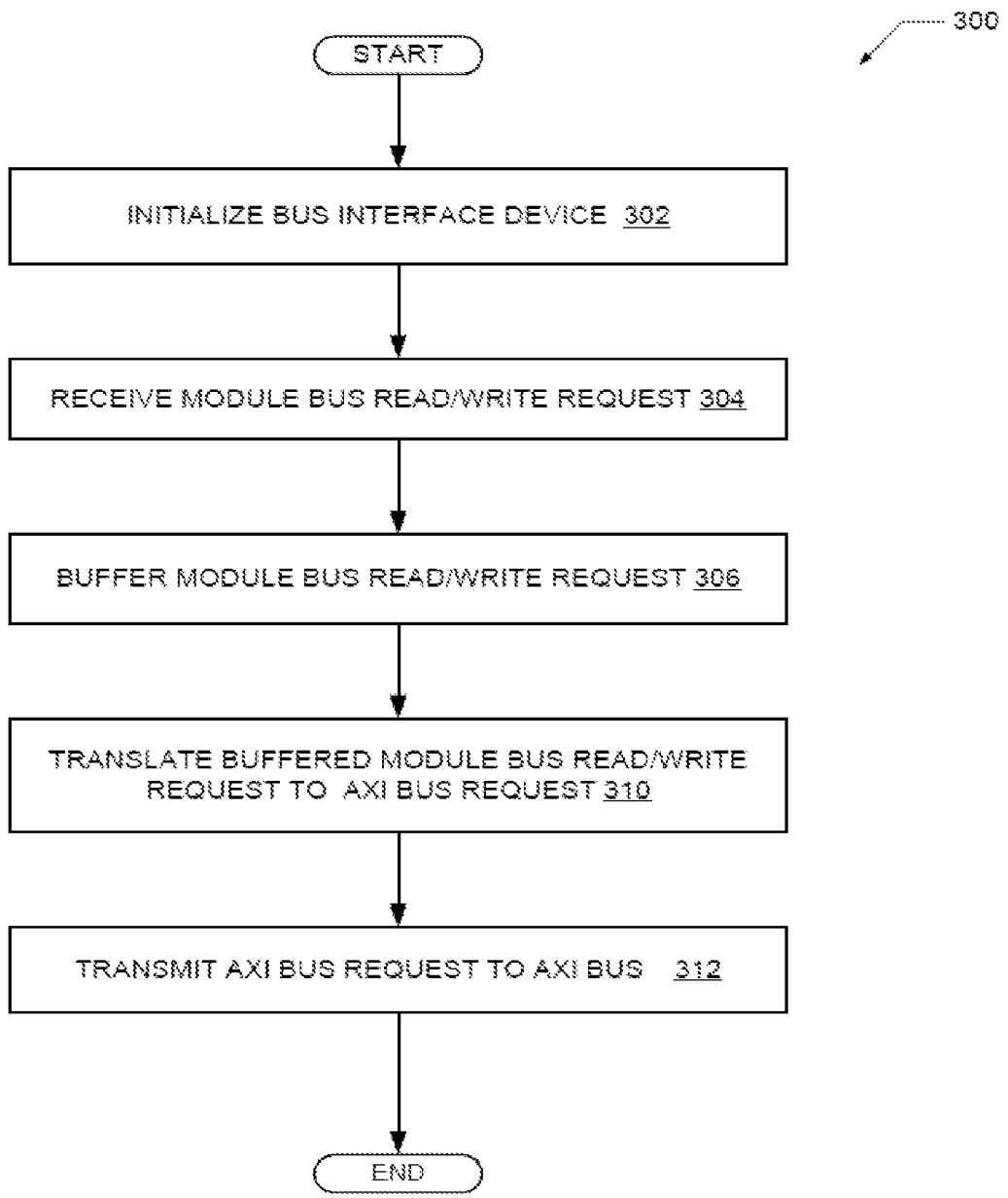
FIG. 3A is a flow chart showing steps in an example method of translating read/write requests from a module bus to an AXI bus, according to an example embodiment.

FIG. 3A is a flow chart showing steps in an example method 300 for translating read/write requests from a module bus to an AXI bus using bus interface device 110. With reference to FIGS. 1-3A, method 300 can be implemented via the use of interface device 110 and specifically by programmable logic 114' programmed as FSMs 230, 232, 234, 236 and 240. However, as noted above, the logic utilized as logic 114 need not be programmable logic for method 300, or method 40, 450 or 500 described below.

Method 300 begins at the start block and proceeds to block 302. At block 302, bus interface device 110 is initialized during start-up including the initialization of programmable logic 114' and establishing communications with other devices within system 100. Programmable logic 114' receives a R/W request that is a module bus protocol (module bus protocol R/W request) (block 304). Programmable logic' 114 buffers the module bus R/W request using one or more of buffers 210-226 to provide a buffered module bus R/W request (block 306). Programmable logic 114' translates the buffered module bus R/W request to a first AXI protocol conforming request (block 310) and transmits the first AXI protocol conforming request to the AXI bus 162 (block 312). Method 300 then ends.

Figure 3B:
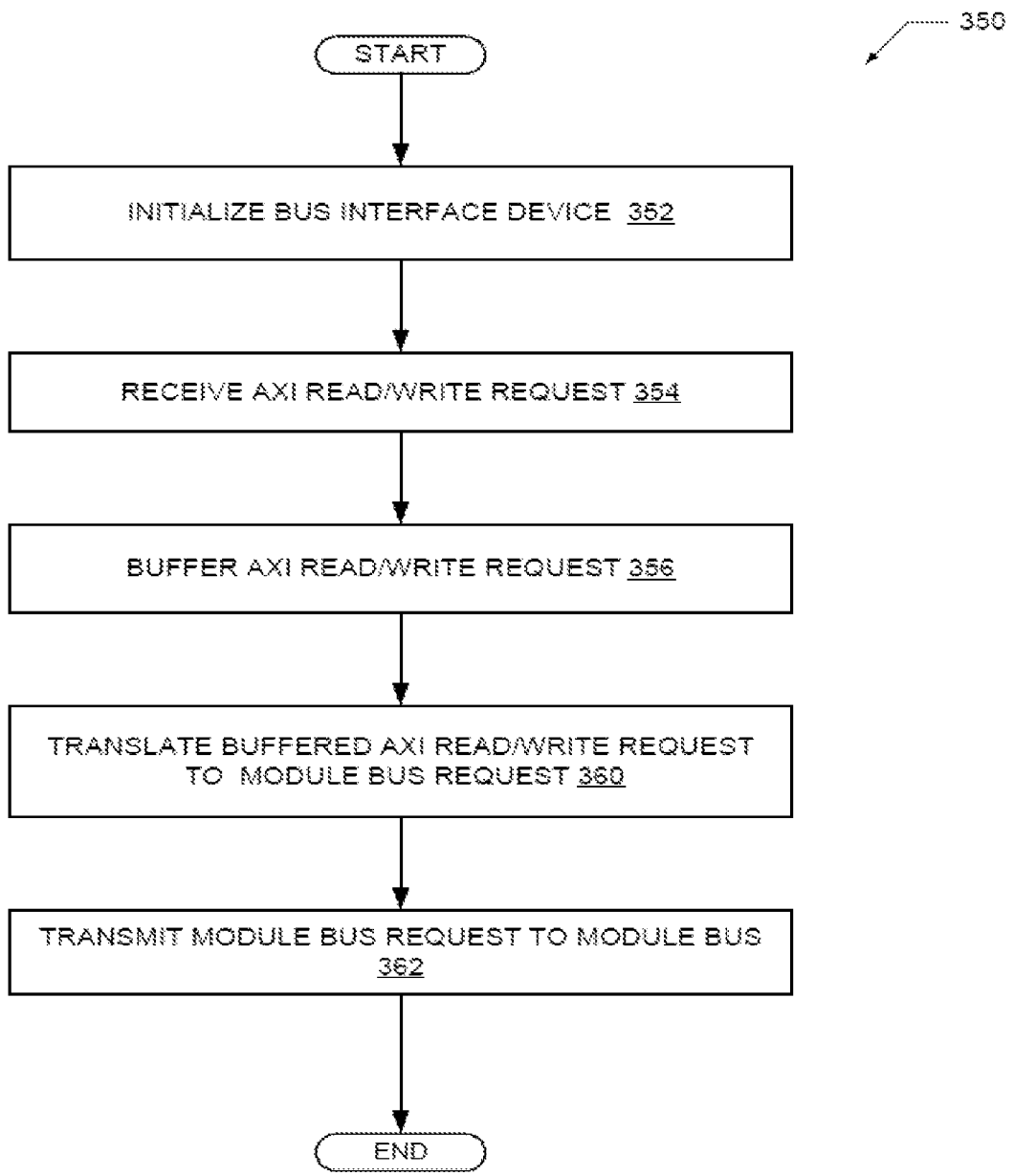
FIG. 3B is a flow chart showing steps in an example method of translating read/write requests from an AXI bus to a module bus, according to an example embodiment.

FIG. 3B is a flow chart showing steps in an example method 350 for translating read/write requests from an AXI bus to a module bus using bus interface device 110. With reference to FIGS. 1-3B, method 350 can be implemented via the use of interface device 110 and specifically by programmable logic 114' programmed as FSMs 230, 232, 234, 236 and 240.

Method 350 begins at the start block and proceeds to block 352. At block 352, bus interface device 110 is initialized during start-up including the initialization of programmable logic 114' and establishing communications with other devices within system 100. Programmable logic 114' receives a R/W request that is an AXI bus protocol (AXI bus protocol R/W request) (block 354). Programmable logic 114 buffers the AXI bus R/W request using one or more of buffers 210-226 to provide a buffered AXI bus R/W request (block 356). Programmable logic 114' translates the buffered AXI bus R/W request to a first module bus protocol conforming request (block 360) and transmits the first module bus protocol conforming request to the module bus 132 (block 362). Method 350 then ends.

Figure 4A:
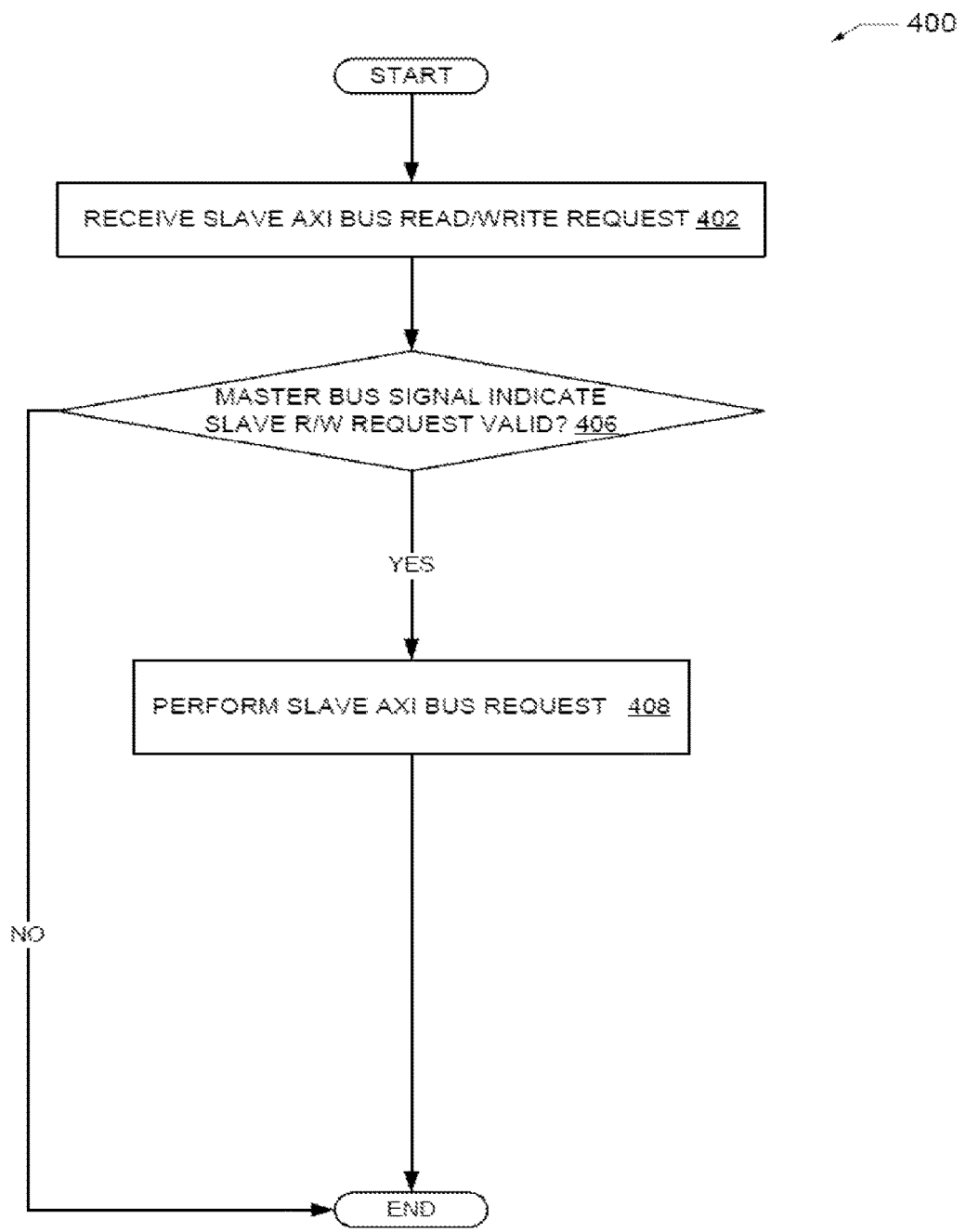
FIG. 4A is a flow chart showing steps in an example method of performing slave AXI bus requests, according to an example embodiment.
Figure 4B:
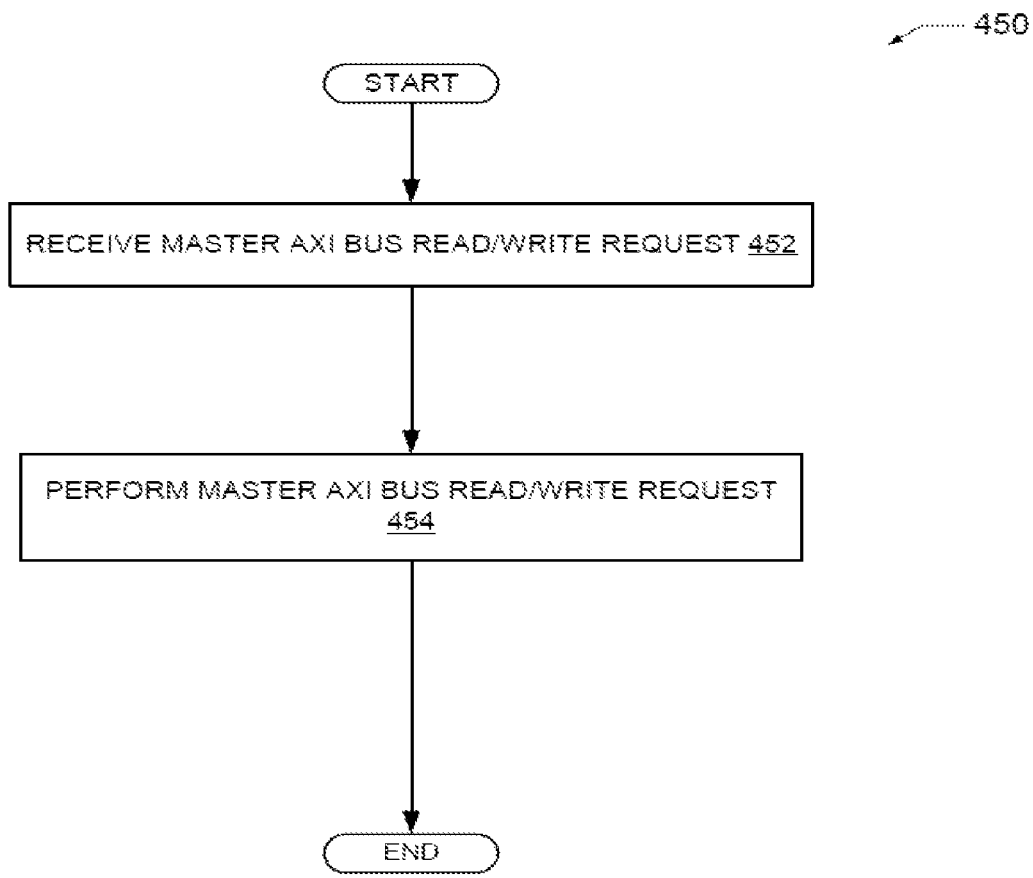
FIG. 4B is a flow chart showing steps in an example method of performing master AXI bus requests, according to an example embodiment.

FIGS. 4A and 4B are flow charts showing steps in example methods 400 and 450 of handling master and slave AXI bus requests using bus interface device 110. With reference to FIGS. 1-4B, method 400 can be implemented via the use of interface device 110 and specifically by programmable logic 114' programmed as FSMs 230, 232, 234, 236 and 240.

With specific reference to FIG. 4A, method 400 begins at the start block and proceeds to block 402. At block 402, programmable logic 114' receives a slave AXI bus R/W request. Programmable logic 114' determines if a master bus signal indicates that the slave AXI bus R/W request is valid (decision block 406). In one embodiment, programmable logic 114' includes separate write valid and read valid signals for each of the address and data on AXI interface 120. In response to the slave AXI bus R/W request being valid, programmable logic 114' performs the slave AXI R/W request (block 408). Method 400 then terminates. In response to the slave AXI bus R/W request not being valid, method 400 ends.

Turning to FIG. 4B, method 450 begins at the start block and proceeds to block 452. At block 452, programmable logic 114 receives a master AXI bus R/W request. Programmable logic 114' performs the master AXI R/W request (block 454). Method 450 then terminates.

Figure 5:
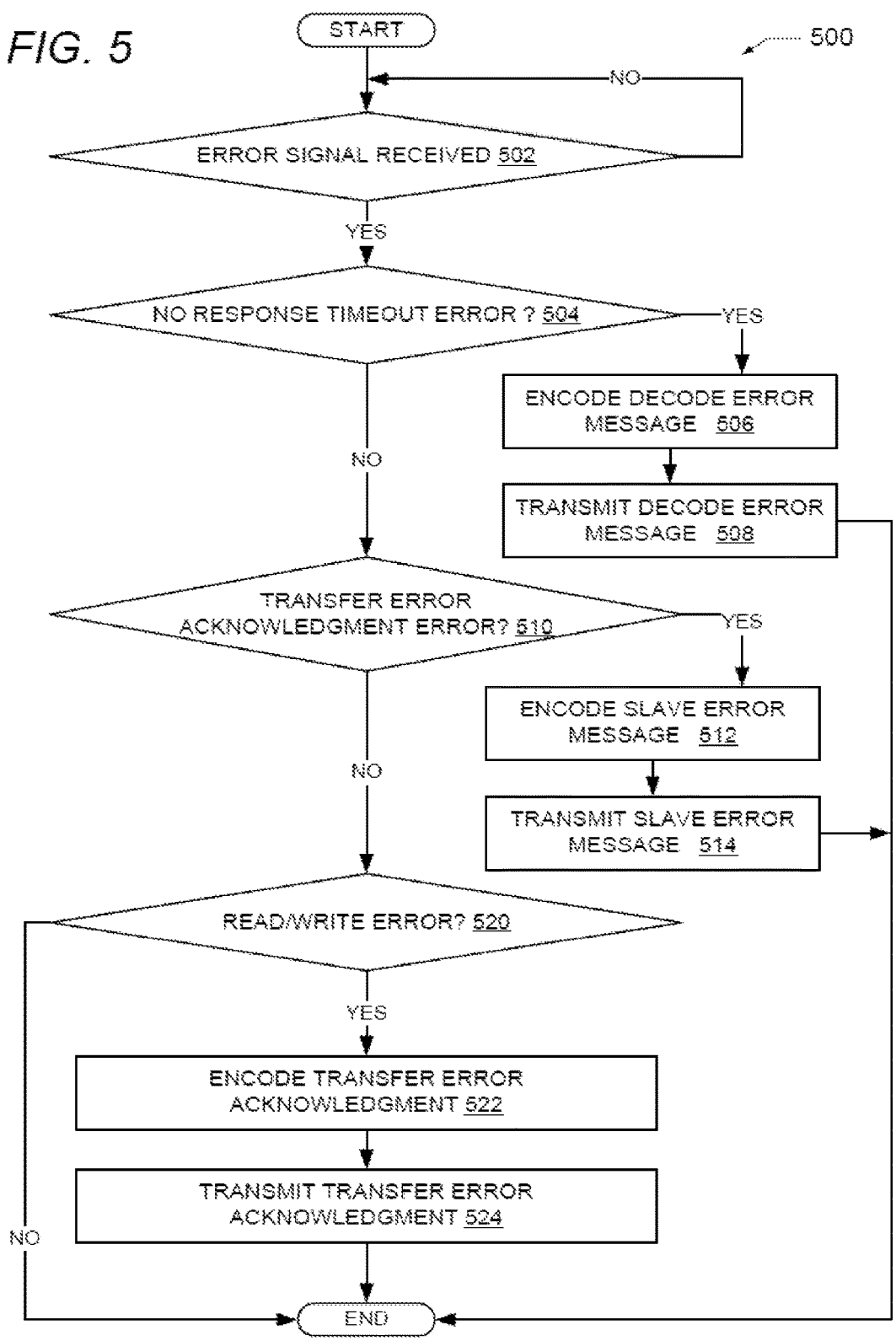
FIG. 5 is a flow chart showing steps in an example method of handling errors in a bus bridge interface device, according to an example embodiment.

FIG. 5 is a flow chart showing steps in an example method 500 of handling received errors in system 100. With reference to FIGS. 1-5, method 500 can be implemented via the use of interface device 110 and specifically by programmable logic 114 programmed as FSMs 230, 232, 234, 236 and 240.

Method 500 begins at the start block and proceeds to block 502. At block 502, Programmable logic 114' determines if any error messages or signals have been received on one or more of the address, signal or data lines 260, 266 or 270. In response to no error messages or signals being received, programmable logic 114' continues to determine if any error messages or signals have been received at block 502. In response to one or more error messages or signals being received, programmable logic 114' identifies if the error is a no response timeout condition error from the module bus (decision block 504). In response to identifying that the no response timeout condition error has occurred, programmable logic 114' encodes a decode error message (block 506) and transmits the decode error message to the AXI bus on a response channel (block 508). Method 500 then ends.

In response to identifying that the no response timeout condition error has not occurred, programmable logic 114' identifies if the error is a transfer error acknowledgment error from the module bus (decision block 510). In response to the error being a transfer error acknowledgment error, programmable logic 114' encodes a slave error message (block 512) and transmits the slave error message to the AXI bus on a response channel (block 514). Method 500 then ends.

In response to the error not being a transfer error acknowledgment error, programmable logic 114' identifies if the error is R/W error (decision block 520). In response to the error being a R/W error, programmable logic 114' encodes a transfer error acknowledgment message (block 522) and transmits the transfer error acknowledgment message to the module bus on a response channel (block 524). Method 500 then ends. In response to the error not being a R/W error, method 500 terminates.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium. Disclosed embodiments are shown implemented as a hardware embodiment, which has performance advantages over software solution. A software embodiment using conventional processors process sequentially, and do not process separate master and slave read and write paths concurrently. If multi cores are used, each core can still process instructions one at a time and also have the latency to fetch instructions and data from memory.

Any combination of one or more computer usable or computer-readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method for bus bridging comprising:
   providing a bus interface device communicatively coupled between at least one module bus and at least one advanced extensible interface (AXI) bus for translating bus requests between said module bus and said AXI bus, said bus interface device including logic, wherein said logic is configured to:
   receive a read/write (R/W) request that is one of a module bus protocol (module bus protocol R/W request) and an AXI bus protocol (AXI bus protocol R/W request);
   buffer said R/W request to provide a buffered R/W request;
   translate via said finite state machine (FSM) said buffered R/W request to a first AXI protocol conforming request if said buffered R/W request is said module bus protocol R/W request and translate via said finite state machine (FSM) said buffered R/W request to a first module bus protocol conforming request if said buffered R/W request is said AXI bus protocol R/W request, wherein the FSM is implemented as sequential logic circuits and is defined by a list of its states and triggering conditions for each transition; and
   transmit said first AXI protocol conforming request to said AXI bus or said first module bus protocol conforming request to said module bus.

2. The method of claim 1, wherein said AXI bus protocol R/W requests include at least one of a master read or write request or a slave read or write request.

3. The method of claim 2 further comprising:
   in response to said R/W request being said master read or write request,
   performing said master read or write request.

4. The method of claim 2, further comprising:
   in response to said R/W request being said slave read or write request, determining if a master bus read valid or write valid signal indicates said slave read or write request is valid; and
   in response to said slave read or write request being valid, performing said slave read or write request.

5. The method of claim 1, further comprising:
   identifying if a no response timeout condition from said module bus has occurred; in response to identifying that said no response timeout condition has occurred, encoding a decode error message; and
   transmitting said decode error message on a response channel of said AXI bus.

6. The method of claim 1, further comprising:
   identifying if a transfer error acknowledgment from said module bus has occurred; in response to identifying that said transfer error acknowledgment has occurred, encoding a slave error message; and
   transmitting said slave error message on a response channel of said AXI bus.

7. The method of claim 1, further comprising:
   identifying if a R/W error from said AXI bus has occurred;
   in response to identifying that said R/W error has occurred, encoding a transfer error acknowledgment; and
   transmitting said transfer error acknowledgment to said module bus.

8. The method of claim 1, wherein said logic includes a buffer comprising at least one of:
   a slave write first in first out (FIFO) buffer; a slave read FIFO buffer;
   a master write FIFO buffer;
   and a master read FIFO buffer.

9. The method of claim 1, wherein said logic further comprises at least one of:
   a slave write data finite state machine (FSM);
   a slave read data FSM;
   a master write FSM;
   a master read FSM; and
   a module bus interface FSM.

10. The method of claim 1, wherein said logic comprises a gate array.

11. A bus interface device comprising: a processor;
    logic in communication with said processor, said bus interface device communicatively coupled between at least one module bus and at least one advanced extensible interface (AXI) bus for translating bus requests between said module bus and said AXI bus, wherein said logic is configured to:
    receive a read/write (R/W) request that is one of a module bus protocol (module bus protocol R/W request) and an AXI bus protocol (AXI bus protocol R/W request);
    buffer said R/W request to provide a buffered R/W request;
    translate via said finite state machine (FSM) said buffered R/W request to a first AXI protocol conforming request if said buffered R/W request is said module bus protocol R/W request and translate via said finite state machine (FSM) said buffered R/W request to a first module bus protocol conforming request if said buffered R/W request is said AXI bus protocol R/W request, wherein the FSM is implemented as sequential logic circuits and is defined by a list of its states and triggering conditions for each transition; and
    transmit said first AXI protocol conforming request to said AXI bus or said first module bus protocol conforming request to said module bus.

12. The bus interface device of claim 11, wherein said AXI bus protocol R/W requests include at least one of a master read or write request or a slave read or write request.

13. The bus interface device of claim 12, further comprising:
    in response to said R/W request being said master read or write request,
    performing said master read or write request.

14. The bus interface device of claim 12, further comprising:
    in response to said R/W request being said slave read or write request, determining if a master bus read valid or write valid signal indicates said slave read or write request is valid; and in response to said slave read or write request being valid, performing said slave read or write request.

15. The bus interface device of claim 11, further comprising:
identifying if a no response timeout condition from said module bus has occurred; in response to identifying that said no response timeout condition has occurred, encoding a decode error message; and
transmitting said decode error message on a response channel of said AXI bus.

16. The bus interface device of claim 11, further comprising:
identifying if a transfer error acknowledgment from said module bus has occurred;
in response to identifying that said transfer error acknowledgment has occurred, encoding a slave error message; and
transmitting said slave error message on a response channel of said AXI bus.

17. The bus interface device of claim 11, further comprising: identifying if a R/W error from said AXI bus has occurred;
in response to identifying that said R/W error has occurred, encoding a transfer error acknowledgment; and
transmitting said transfer error acknowledgment to said module bus.

18. The bus interface device of claim 11, wherein said logic includes a buffer comprising at least one of:
a slave write first in first out (FIFO) buffer;
a slave read FIFO buffer;
a master write FIFO buffer; and
a master read FIFO buffer.

19. The bus interface device of claim 11, wherein said logic further comprises at least one of:
a slave write data finite state machine (FSM);
a slave read data FSM;
a master write FSM;
a master read FSM; and
a module bus interface FSM.

20. The bus interface device of claim 11, wherein said logic comprises a gate array.

* * * * *